United States Patent
Naruoka et al.

(10) Patent No.: US 9,945,288 B2
(45) Date of Patent: Apr. 17, 2018

(54) ROTARY UNIT OF SUPERCHARGER FOR ENGINE AND BALANCE ADJUSTMENT METHOD THEREOF

(71) Applicant: KAWASAKI JUKOGYO KABUSHIKI KAISHA, Kobe-shi, Hyogo (JP)

(72) Inventors: Shohei Naruoka, Kakogawa (JP); Hisatoyo Arima, Himeji (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 43 days.

(21) Appl. No.: 15/083,782

(22) Filed: Mar. 29, 2016

(65) Prior Publication Data

US 2016/0208682 A1    Jul. 21, 2016

Related U.S. Application Data

(63) Continuation of application No. PCT/JP2013/080516, filed on Nov. 12, 2013.

(51) Int. Cl.
*F02B 33/40* (2006.01)
*F01D 25/16* (2006.01)
(Continued)

(52) U.S. Cl.
CPC .............. *F02B 39/04* (2013.01); *F01D 5/025* (2013.01); *F01D 5/027* (2013.01); *F01D 5/04* (2013.01); *F01D 11/14* (2013.01); *F01D 25/16* (2013.01); *F01D 25/28* (2013.01); *F02B 33/40* (2013.01); *F02B 39/12* (2013.01); *F02C 6/12* (2013.01);
(Continued)

(58) Field of Classification Search
CPC .......... F02B 33/40; F02B 39/04; F02B 39/12; F02D 23/005; F01D 5/027; F01D 25/28
See application file for complete search history.

(56) References Cited

U.S. PATENT DOCUMENTS 5,063,904 A * 11/1991 Winkelmann .......... F02B 39/04
123/559.1
5,105,793 A    4/1992 Winkelmann et al.
(Continued)

FOREIGN PATENT DOCUMENTS

JP    03-500319    1/1991
JP    06-012798    2/1994
(Continued)

OTHER PUBLICATIONS

Suvo, "Helical Gears vs. Spur Gears," Aug. 18, 2010.*
(Continued)

*Primary Examiner* — Audrey K Bradley (57) ABSTRACT

A rotary unit is rotatably accommodated within a supercharger casing of a supercharger for pressurizing an intake air of an engine. The rotary unit includes a supercharger rotary shaft, an impeller fixed to a tip end portion of the supercharger rotary shaft, a rotating component rotatable together with the supercharger rotary shaft independently of the impeller, and a nut member for pressing the impeller and the rotating component in a direction axially of the supercharger rotary shaft to thereby fix them to the supercharger rotary shaft. The nut member is formed with an adjustment portion for the rotational balance adjustment.

2 Claims, 3 Drawing Sheets

(51) Int. Cl.
*F01D 25/28* (2006.01)
*F01D 11/14* (2006.01)
*F02B 39/04* (2006.01)
*F02B 39/12* (2006.01)
*F01D 5/02* (2006.01)
*F02D 23/00* (2006.01)
*F01D 5/04* (2006.01)
*F02C 6/12* (2006.01)

(52) U.S. Cl.
CPC ........ *F02D 23/005* (2013.01); *F05D 2220/40* (2013.01); *F05D 2260/40311* (2013.01)

(56) References Cited

U.S. PATENT DOCUMENTS

| | | | | |
|---|---|---|---|---|
| 5,887,576 | A * | 3/1999 | Wheeler, Jr. | F02B 33/40 123/559.1 |
| 9,127,591 | B2 | 9/2015 | Arima et al. | |
| 2010/0178132 | A1 * | 7/2010 | Ante | F01D 5/025 411/427 |
| 2012/0186565 | A1 | 7/2012 | Arima et al. | |
| 2014/0147306 | A1 * | 5/2014 | Yamashita | F02B 37/10 417/410.1 |

FOREIGN PATENT DOCUMENTS

| | | |
|---|---|---|
| JP | 07-022036 | 4/1995 |
| JP | 2010203803 A * | 9/2010 |
| JP | 2011-247236 | 12/2011 |
| JP | 2012-092815 | 5/2012 |
| JP | 2013-224676 | 10/2013 |
| WO | WO2012/169463 | 12/2012 |

OTHER PUBLICATIONS

English Translation of the International Preliminary Report on Patentability and Written Opinion of the International Searching Authority dated May 26, 2016 for International PCT Patent Application No. PCT/JP2013/080516, filed Nov. 12, 2013 (7 pages).

Notification of Reason(s) for Rejection dated Feb. 28, 2017 for Corresponding Japan Patent Application No. 2015-547298 with English Language Summary (4 pages).

International Search Report (dated Feb. 4, 2014) for PCT/JP2013/080516 (4 pages).

Extended and Supplementary Search Report dated Jun. 21, 2017 for Corresponding European Patent Application No. 13897415.9 (9 pages).

* cited by examiner

ROTARY UNIT OF SUPERCHARGER FOR ENGINE AND BALANCE ADJUSTMENT METHOD THEREOF

CROSS REFERENCE TO THE RELATED APPLICATION

This application is a continuation application, under 35 U.S.C § 111(a) of international application No. PCT/JP2013/080516, filed Nov. 12, 2013.

BACKGROUND OF THE INVENTION

Field of the Invention

The present invention relates to a rotary unit which is rotatably accommodated within a supercharger casing of a mechanical supercharger for pressurizing an intake air of an engine, and a balance adjusting method thereof.

Description of Related Art

A combustion engine mounted on an automotive vehicle such as, for example, a motorcycle has been known in which a supercharger is provided for pressurizing an air and supplying it to the engine. In this respect, see, for example, Patent Document 1 listed below. This supercharger is driven in operative association with rotation of an engine rotary shaft.

PRIOR ART LITERATURE

Patent Document 1: JP Laid-open Patent Publication No. 03-500319

In a rotary unit of the supercharger, when, after a rotary shaft with only an impeller mounted thereon has been adjusted in balance, gears for input use, oil seals and others are incorporated to the rotary shaft, the need is realized to perform the balance adjustment again after the incorporation.

SUMMARY OF THE INVENTION

In view of the foregoing, the present invention has been devised to substantially eliminate the foregoing problem and inconvenience and is intended to provide a rotary unit, with which the balance adjustment can be easily accomplished, and a balance adjusting method therefor.

In order to accomplish the foregoing object, the present invention in accordance with one aspect thereof provides a rotary unit of a supercharger adapted to be rotatably accommodated within a casing of the supercharger to pressurize an intake air of an engine, which unit includes a rotary shaft, an impeller fixed to a tip end portion of the rotary shaft, a rotating component rotatable together with the rotary shaft and being separate from the impeller, and a fixing member to fix the impeller and the rotating component to the rotary shaft while pressing them in an axial direction of the rotary shaft. An adjustment portion for the rotational balance adjustment is formed in either the rotating component or the fixing member. The rotating component referred to above includes, for example, an inner ring of a bearing used to support the rotary shaft in the casing, and a collar for a spacer.

According to the present invention, since with the use of the fixing member the impeller and the rotating component are integrated together with the rotary shaft, the rotary unit can be integrally fitted to the supercharger. As a result, in a condition with the impeller and the rotating component integrated with the rotary shaft, the balance of the rotary unit can be accomplished, and therefore, the balance adjustment after they have been incorporated in the supercharger is no longer needed. Hence, the number of assembling steps can be reduced. Also, since the adjustment portion for the rotational balance adjustment is provided in the rotating component or the fixing member, as compared with the impeller being notched or ground, the number of choices increases and the balance adjustment can be facilitated.

In a preferred embodiment of the present invention, the rotary unit referred to above may include a non-rotating component, which does not rotate together with the rotary shaft, in which case the rotary unit is fixed to the casing through the non-rotating component. The non-rotating component referred to above includes, for example, an outer ring of a bearing to allow the rotary shaft to be supported by the casing, a bearing housing to accommodate the bearing, an oil seal to prevent an a lubricant oil for bearings from leaking towards an impeller side. According to this construction, since the balance can be adjusted in a condition with the non-rotating component also integrated together with the rotary unit, the number of the assembling steps can be further reduced. Also, since the non-rotating component is fixed to the casing, the rotary unit can be easily fitted to the casing.

The supercharger of the present invention is provided with the rotary unit and the non-rotating component, which non-rotating component includes a bearing for supporting the rotary shaft in the casing, a bearing housing configured to accommodate the bearing and a stopper member to prevent an axial movement of the bearing housing, in which case the bearing housing is supported in the casing for movement in a radial direction and the stopper member is fixed to the casing. According to this structural feature, since the bearing housing is movable in the radial direction, the fluctuation of the rotary shaft resulting from the use of the planetary gear device can be absorbed. In such case, although the bearing housing cannot be fixed to the casing, fixing the stopper member to the casing allows the rotary unit to be rotatably accommodated in the casing.

Where the bearing housing is radially movably supported by the casing, the bearing housing is preferably supported in the casing through an oil layer for movement in the radial direction, in which case the stopper member includes a seal holding body to hold an oil seal used to avoid an oil leakage from the oil layer. According to this structural feature, the seal holding body and the stopper member can be concurrently used and, therefore, the number of component parts to be assembled is reduced.

Where the non-rotating component is provided, a shim to adjust the tip clearance defined between the impeller and the casing is preferably inserted in between the non-rotating component and the casing. According to this structural feature, the adjustment of the clearance of the impeller can be facilitated.

A balance adjusting method for a rotary shaft of the supercharger of the present invention is a method of adjusting the balance of the rotary shaft of the supercharger prior to assemblage of the centrifugal flow supercharger for pressurizing an intake air for an engine, which method includes a rotary unit assembling step of mounting to the rotary shaft an impeller, fixed to a tip end portion of the rotary shaft, a rotating component which is separate from the impeller and capable of rotating integrally with the rotary shaft, and then axially pressing the impeller and the rotating component with the use of a fixing member to fix to the rotary shaft thereby to assemble a rotary shaft, and a rotational balance adjusting step of adjusting the rotational balance of the rotary unit by forming an adjustment portion in the rotating component or the fixing member to allow an adjustment on the adjustment portion.

In the construction hereinbefore described, since the impeller and the rotating component are integrated together with the rotary shaft by the use of the fixing member, the rotary unit can, as an integral unit, be integrally fitted to the supercharger. As a result, in a condition in which the impeller and the rotating component are integrated with the rotary shaft, the balance of the rotary unit can be adjusted and, therefore, the number of assembling steps is reduced. Also, since the adjustment portion for the rotational balance adjustment is provided in the rotating component or the fixing member, as compared with grinding of only the impeller, the number of choices in adjustment area is increased to facilitate the balance adjustment.

In the balance adjusting method of the present invention, a bearing hosing is provided in the rotary unit to accommodate therein a bearing to support the rotary shaft, and during the rotational balance adjusting step, the rotary unit is preferably rotated, in a condition while fixedly supporting the bearing housing, to adjust the rotational balance of the rotary unit. According to this structural feature, since the rotational balance of the rotary unit is adjusted while the bearing housing is supported, the adjusting work can be facilitated.

The assembling method of the supercharger of the present invention is to provide the rotary unit with the non-rotating component that does not rotate together with the rotary shaft, and a shim is then inserted in between the non-rotating component and the casing to adjust the tip clearance delimited between the impeller and the casing. According to this structural feature, the adjustment of the clearance of the impeller can be facilitated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter a preferred embodiment of the present invention will be described in detail with particular reference to the accompanying drawings. In describing the present invention, however, the terms "left and right" used hereinabove and hereinafter are to be understood as relative terms description of positions and/or direction as viewed from a driver maneuvering a vehicle such as a motorcycle.

Figure 1:
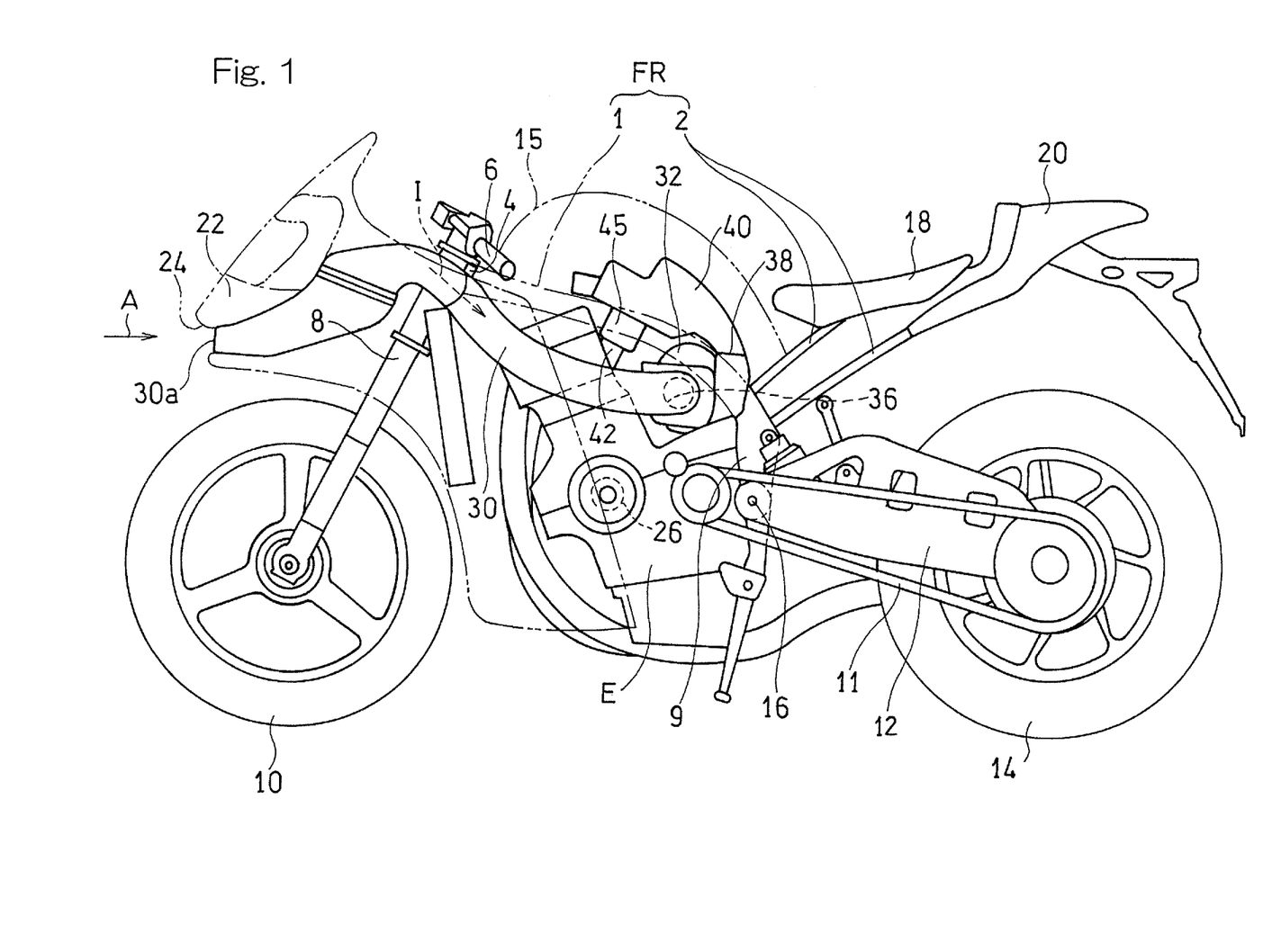
FIG. 1 is a schematic side view showing a motorcycle equipped with a supercharger of a kind including a rotary unit designed in accordance with a preferred embodiment of the present invention.

FIG. 1 illustrates a left side view of the motorcycle equipped with a supercharger having incorporated therein a rotary unit that is designed in accordance with a preferred embodiment of the present invention. The motorcycle shown therein includes a motorcycle frame structure FR including a main frame 1, which forms a front half portion thereof, and a seat rail 2 which forms a rear half portion thereof. The seat rail 2 is secured to a rear portion of the main frame 1. The main frame 1 has its front end formed integrally with a head pipe 4, and a front fork 8 is rotatably supported by the head pipe 4 through a steering shaft (not shown). The front fork 8 has a lower end portion to which a front wheel 10 is fitted, and a steering handlebar 6 is fixed to an upper end portion of the front fork 8.

A rear end portion of the main frame 1, which is a lower intermediate portion of the motorcycle frame structure FR, is provided with a swingarm bracket 9. A swingarm 12 is supported by a pivot pin 16, fitted to the swingarm bracket 9, for movement up and down about the pivot pin 16. This swingarm 12 has a rear end portion by which a rear wheel 14 is rotatably supported. A combustion engine, which is a drive source of the motorcycle, is fitted to a lower intermediate portion of the motorcycle frame structure FR and on a front side of the swingarm bracket 9. This combustion engine E drives the rear wheel 14 through a power transmission mechanism 11 such as, for example, a substantially endless chain. The combustion engine E is in the form of, for example, a water-cooled four cylinder, four cycle parallel multi-cylinder engine, but in the practice of the present invention, the combustion engine may not be necessarily limited to that specific type described above.

A fuel tank 15 is disposed on an upper portion of the main frame 1, and a driver's seat 18 and a fellow passenger's seat 20 are supported on the seat rail 2. Also, a cowing or fairing 22 made of a resinous material is mounted on a front portion of a vehicle body. The fairing 22 covers an area ranging from forwardly of the head pipe 4 to opposite lateral areas of the front portion of the vehicle body. The fairing 22 has an air intake opening 24 defined therein. The air intake opening 24 is positioned at a front end of the fairing 22 and is operable to introduce an intake air from the outside therethrough to the combustion engine E.

An air intake duct 30 is disposed on a left side of the motorcycle frame structure FR, and this air intake duct 30 is supported by the head pipe 4 with its front end opening 30a aligned with the air intake opening 24. Air introduced from the front end opening 30a of the air intake duct 30 is increased in pressure by the known ram effect.

A supercharger 32 is disposed rearwardly of the combustion engine E. This supercharger 32 is operable to pressurize an air and then supply it to the combustion engine E. The air intake duct 30 referred to above is, after having extended from front of the combustion engine E towards an outer left side thereof in a forward and rearward direction, is curved inwardly of the motorcycle, and is fluid connected with a suction port 36 of the supercharger 32, whereby an incoming wind A can be introduced into the supercharger 32 as an intake air I.

An intake air chamber 40 is disposed between a discharge port 38 of the supercharger 32 and an air intake port 42 of the combustion engine E, and the discharge port 38 of the supercharger 32 is directly connected with the intake air chamber 40. The intake air chamber 40 serves to reserve the high pressure intake air I supplied from the discharge port 38 of the supercharger 32. It is, however, to be noted that the discharge port 38 of the supercharger 32 and the intake air chamber 40 may be connected with each other through a pipe. Between the intake air chamber 40 and the air intake port 42, a throttle body 45 is disposed.

The intake air chamber 40 is disposed above the supercharger 32 and the throttle body 45. Above the intake air chamber 40 and the throttle body 45, the fuel tank 15 is disposed.

Figure 2:
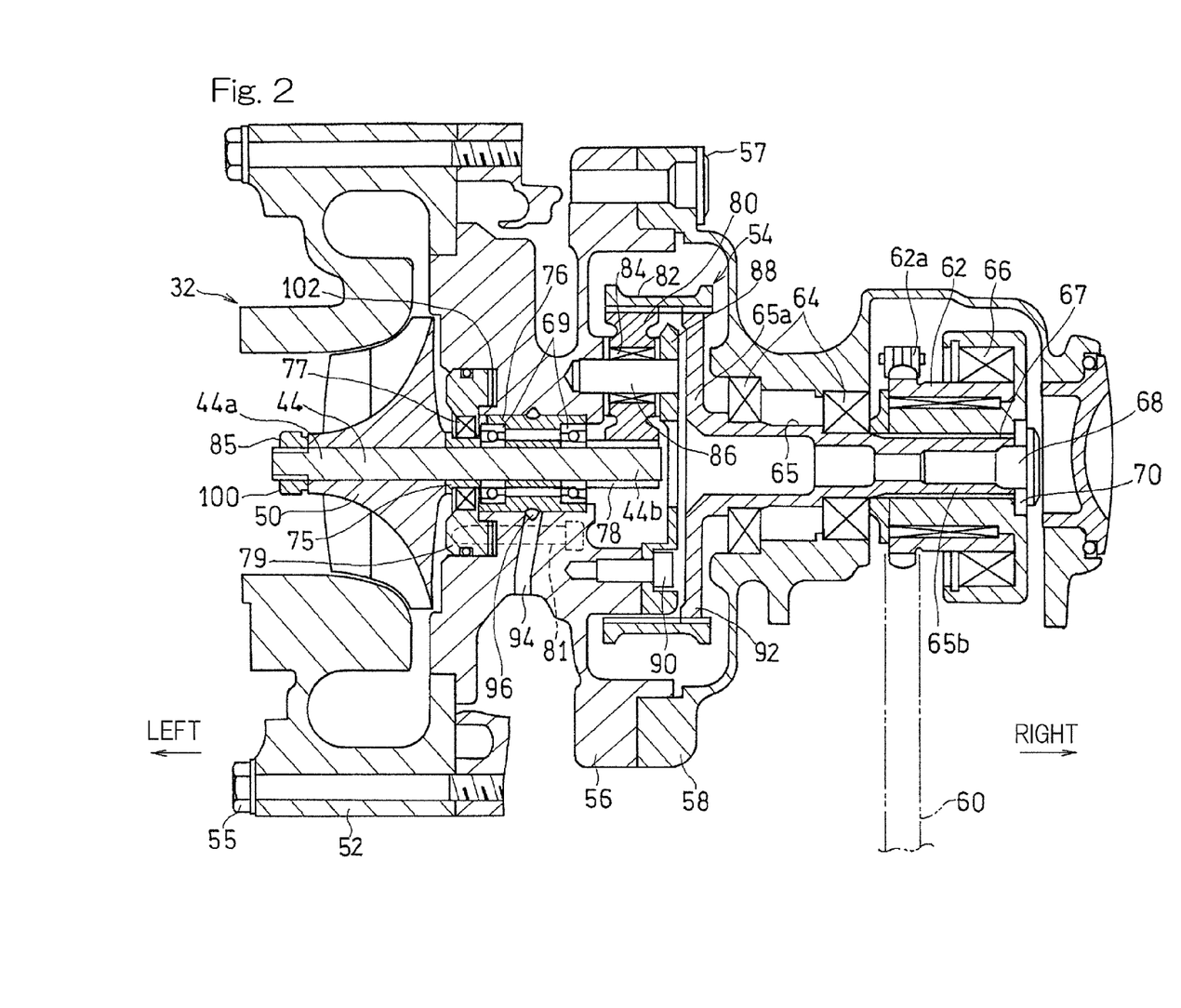
FIG. 2 is a horizontal sectional view showing the supercharger.

As shown in FIG. 2, the supercharger 32 is of a centrifugal flow type and includes a supercharger rotary shaft 44, an impeller 50 secured to one end portion (left side end portion 44a) of the supercharger rotary shaft 44, an impeller housing 52 for covering the impeller 50, a supercharger casing 56 for rotatably supporting the supercharger rotary shaft 44, a transmission mechanism 54 for transmitting a power of the combustion engine E to the impeller 50, and a transmission mechanism casing 58 for enclosing the transmission mechanism 54. The impeller 50 employed in the practice of this embodiment is made of an aluminum alloy, but the material therefor may not necessarily limited thereto and the impeller 50 may be made of a resinous material.

The impeller housing 52 and the supercharger casing 56 are connected together with the use of bolts 55, and the supercharger casing 56 and the transmission mechanism casing 58 are connected together with the use of bolts 57. In the practice of the embodiment now under discussion, the transmission mechanism 54 is employed in the form of a planetary gear transmission device, but the present invention is not necessarily limited to the use of the planetary gear type transmission device.

The supercharger 32 referred to above is driven by a power of the combustion engine E. Specifically, a rotational force of a crankshaft 26 (shown in FIG. 1) is transmitted to an input shaft 65 of the transmission 54, which is connected with the supercharger rotary shaft 44, through a substantially endless chain 60 shown in FIG. 2. In particular, the input shaft 65 has a right side end portion provided with a sprocket 62, and the chain 60 is trained around a geared portion 62a of the sprocket 62.

The input shaft 65 is employed in the form of a hollow shaft and is rotatably supported by the transmission mechanism casing 58 by means of bearings 64. A right side end portion 65b, which is a tip end portion, of the input shaft 65 has an outer peripheral surface formed with splined teeth 67, and a one-way clutch 66 is splined to this outer peripheral surface. Via this one-way clutch 66, the sprocket 62 is connected with the input shaft 65. The right side end portion 65b of the input shaft 65 has an inner peripheral surface formed with a female threaded portion, and the one-way clutch 66 is, by means of a head portion of a bolt 68 that is threadingly engaged with this female threaded portion, mounted on the right side end portion 65b through a washer 70.

A right side portion 44b, which is a base end portion of the supercharger rotary shaft 44 of the supercharger 32, is connected with a left side end portion 65a, which is a base end portion of the input shaft 65, through the planetary gear device (transmission mechanism) 54. The left side end portion 65a of the input shaft 65 is comprised of a collar shaped flange portion 65a. The supercharger rotary shaft 44 is formed in the form of a solid shaft. The supercharger rotary shaft 44 is rotatably supported by the supercharger casing 56 through bearings 69.

Figure 3:
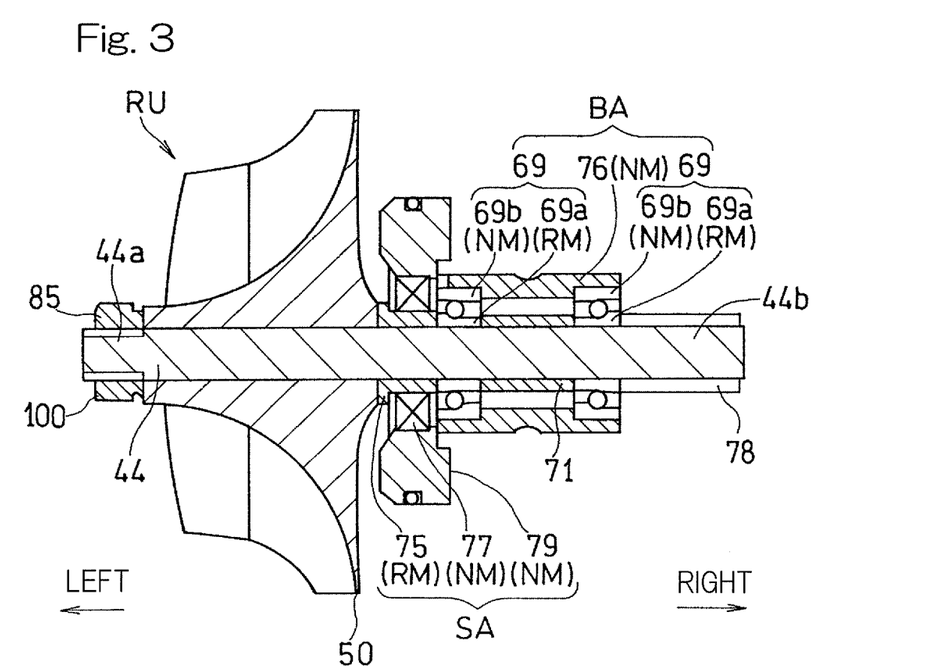
FIG. 3 is a horizontal sectional view showing, on an enlarged scale, the rotary unit.

As shown in FIG. 3, the two bearings 69 are positioned spaced a distance from each other in an axial direction (in the leftward and rightward direction or widthwise direction of the motorcycle). Each of those bearings 69 includes an inner ring 69a, which is a rotation member, and an outer ring 69b which is a stationary or non-rotating member. A spacer 71, which is a spacer member, is disposed between the two inner rings 69a and 69a. Those bearings 69 and 69 are accommodated within a bearing housing 76 to thereby form a part of a bearing assembly BA. In other words, the inner ring 69a is a rotating component RM, which is rotatable integrally with the supercharger rotary shaft 44, whereas the outer ring 69b and the bearing housing 76 are non-rotating components NM which do not rotate integrally with the supercharger rotary shaft 44. The bearing housing 76 forms an outer peripheral portion of the bearing assembly BA. The spacer 71, also, forms a part of the bearing assembly BA.

The bearing assembly BA can rotatably support the supercharger rotary shaft 44 in a condition that an outer peripheral portion thereof is fixedly held. This bearing assembly BA is so structured and so configured as to be removably accommodated within an assembly accommodating space defined in the supercharger casing 56. Specifically, when and so long as the bearing assembly BA is accommodated within the supercharger casing 56, a radial gap is formed between the bearing assembly BA and the supercharger casing 56. An oil layer 96 as will be discussed in detail later is so formed in this radial gap that the bearing assembly BA can be floatingly supported relative to the supercharger casing 56.

Each of the bearings 69 forming a part of the bearing assembly BA is employed in the form of, for example, an angular contact ball bearing. The bearing housing 76 for the bearing assembly BA is formed with stepped portions which axial end faces of the respective outer rings 69b and 69b are brought into contact with. Axial length between the stepped portions is the same as that of the spacer 71. Accordingly, the bearing housing 76 are axially fixed relative to the two bearings 69. Also, a right side end face of the bearing housing 76 is axially opposed to the supercharger casing 56, and accordingly, a rightward movement of the bearing assembly BA is regulated, that is, restricted.

The right side end portion (base end portion) 44b of the supercharger rotary shaft 44 is formed with an external threaded gear 78. This externally threaded gear 78 is so formed as to have a diameter greater than the remaining portion of the supercharger rotary shaft 44. With a left side end face of the externally threaded gear 78, a right side end face of the inner ring 69a of the right side bearing 69 is brought into contact.

An oil seal assembly SA is disposed between the impeller 50 and the bearing assembly BA in the supercharger rotary shaft 44. This oil seal assembly SA includes a tubular collar 75, mounted on the supercharger rotary shaft 44 and sandwiched between the impeller 50 and the inner ring 69a of the left side bearing 69, and a seal holding body 79 for holding an oil seal 77 used to prevent the oil from leaking from an oil layer 96 (shown in FIG. 2) as will be described in detail later.

As shown in FIG. 2, the seal holding body 79 is supported by the supercharger casing 56 by means of a bolt 81. In other words, the seal holding body 79 functions as a stopper member for preventing the bearing assembly BA from moving in the axial direction. The collar 75 of the oil seal assembly SA forms a rotating component RM rotatable together with the supercharger rotary shaft 44, whereas the oil seal 77 and the seal holding body 79 are non-rotating components NM that do not rotate together with the supercharger rotary shaft 44.

The collar 75 is sandwiched between the impeller 50 and the inner ring 69a of the bearing assembly BA, and is then fixed to the supercharger rotary shaft 44. The seal holding body 79 serves to hold the oil seal 77, and the oil seal 77 serves to block off a radial gap between the collar 75 and the seal holding body 79 to thereby prevent the oil from leaking towards an impeller 50 side. A bolt hole necessitated to fit the seal holding body 79, which hole is formed in the supercharger casing 56, is formed radially outwardly of the assembly accommodating space. A left side end face of the bearing housing 76 is axially opposed to the seal holding body 79, and accordingly, leftward movement of the bearing assembly BA is restricted.

A male threaded portion is formed on an outer peripheral surface of the left side end portion (tip end portion) of the supercharger rotary shaft 44, and a nut member 85 is theadingly engaged with this female threaded portion. The nut member 85 forms a fixing member used to urge the impeller 50, the collar 75 and the inner ring 69a of the bearing assembly BA in an axial direction of the supercharger rotary shaft 44 against the externally threaded gear 78 in the base end portion of the supercharger rotary shaft 44, to thereby secure them in position between the nut member 85 and the externally threaded gear 78. The nut member 85 is made of a material of a kind having a specific gravity higher than that of the material for the impeller 50, and is specifically employed in the form of a hexagonal nut member made of iron or copper.

As shown in FIG. 3, the supercharger rotary shaft 44, the impeller 50, the oil seal assembly SA, the bearing assembly BA and the nut member 85 cooperate with each other to define a portable rotary unit RU that is removably accommodated within the supercharger casing 56 together with a member rotatable together with the impeller 50 and that is unitized. The rotary unit RU does preferably include all of members that are rotatable together with the impeller 50. This rotary unit RU rotates at a high speed, and in the practice of the embodiment now under discussion, rotates at a speed equal to or higher than 50,000 rotations or higher per minute.

Each of the opposite end faces of the impeller 50, which lie in the axial direction (leftward and rightward direction), is formed in respective planes perpendicular to the axial direction. The left side end face forms a bearing surface with which the nut member 85 contacts, whereas the right side end face forms an abutment surface with which the collar 75 contacts. In the practice of the embodiment now under discussion, the right side end face of the impeller 50 is in contact with the left side end face of the externally threaded gear 78 indirectly through the collar 75, the inner ring 69a and the spacer 71.

In other words, in a condition in which the right end face of the impeller 50 is indirectly in contact with the left side end face of the externally threaded gear 78, the left side end face of the impeller 50 is urged by the nut member 85 to thereby secure the impeller 50 to the supercharger rotary shaft 44. Here, a male threaded portion formed in the left side end portion 44a of the supercharger rotary shaft 44 is so set as to enable the nut member 85 to be turned in a fastening direction when the supercharger rotary shaft 44 is rotated. Also, the externally threaded gear 78 is formed to represent a helical gear shape and is so configured that, when the supercharger rotary shaft 44 is rotated, an axial force counter to the direction of the suction reactive force, which is generated due to rotation of the impeller 50, may act on the supercharger rotary shaft 44. With the externally threaded gear 78 employed in the form of a helical gear, an axially acting load imposed on the bearings 69 can be reduced.

The nut member 85 is formed with an adjustment portion 100 for the rotational balance adjustment of the rotary unit RU. The adjustment portion 100 is defined by notching or padding. It is, however, to be noted that in addition to the nut member 85, the adjustment portion 100 may also be provided in a back surface of the impeller 50. This adjustment portion 100 is preferably provided at a site where the specific gravity is higher than the impeller 50. In the practice of the embodiment now under discussion, the impeller 50 is made of an aluminum alloy while the nut member 85 is made of a copper material, and therefore, the nut member 85 forms the site where the specific gravity is higher than the impeller 50.

A power is inputted into the rotary unit RU through the planetary gear device 54. This planetary gear device 54 is disposed between the input shaft 65 and the supercharger rotary shaft 44, and is supported within the transmission casing 58. The right side end portion (base end portion) 44b of the supercharger rotary shaft 44 is formed with the external threaded gear 78, and a plurality of planetary gears 80 are threadingly connected with the externally threaded gear 78 while having been juxtaposed relative to each other in a circumferential direction. That is to say, the externally threaded gear 78 of the supercharger rotary shaft 44 functions as a sun gear of the planetary gear device 54. Also, the planetary gears 80 are threadingly connected with an internally threaded gear (ring gear) of a large diameter on a radially outer side thereof. The planetary gears 80 are rotatably supported by a carrier shaft 86 by means of bearings 84 mounted on the supercharger casing 56.

The carrier shaft 86 is fixed to a fixing member 88, and the fixing member 88 is in turn fixed to the supercharger casing 56 by means of a bolt 90. In other words, the carrier shaft 86 is fixed. The internally threaded gear 82 is drivingly connected with an input gear 92 that is provided on the left side end portion of the input shaft 65. Hence, the internally threaded gear 82 is drivingly connected so as to rotate in the same direction as that of the input shaft 65 and, with the carrier shaft 86 fixed, the planetary gears 80 rotate in the same direction as that of the internally threaded gear 82. The sun gear (externally threaded gear 78) is formed on the supercharger rotary shaft 44, which forms an output shaft of the planetary gear device 54, and rotates in the direction counter to that of the planetary gears 88.

The supercharger casing 56 is formed with a lubricant oil passage 94 for guiding a lubricant oil to the bearing housing 76, which passage 94 is in communication with a supercharger lubricant passage (not shown) provided outside of the supercharger casing 56. Specifically, the oil layer 96 referred to previously is formed between the supercharger casing 56 and the bearing housing 76, and the lubricant oil passage 94 is fluid connected with the oil layer 96. Accordingly, the bearing housing 76 is supported by the supercharger casing 56 through the oil layer 96 for movement in a radial direction. The oil layer 96 has a function of relieving oscillation of the supercharger rotary shaft 44.

An annular plate shaped shim 102 for adjusting a tip clearance, which is a gap between a tip end of the impeller 50 and an inner peripheral surface of the impeller housing 52, is inserted in between the seal holding body 79 (non-rotating component NM) and the supercharger casing 56.

Specifically, the supercharger casing 56 is formed with a shim accommodating space, and the shim 102 is interposed between the seal holding body 79 and the supercharger casing 56. The shim 102 is removable relative to the supercharger casing 56. The shim accommodating space is formed on a radially outer side of the assembly accommodating space. As the number of the shim 102 increases, the seal holding body 79 is fixed to the supercharger casing 56 at a position spaced leftwards relative to the supercharger casing 56. For example, a plurality of shims 102 having varying thicknesses are prepared, and one or a plurality of the shims 102 is/are disposed between the seal holding body 79 and the supercharger casing 56. Specifically, in a condition in which the bearing housing 76 is in contact with the seal holding body 79, the shim 102 is selected so that the tip clearance between the impeller 50 and the impeller housing 52 may fall within a predetermined range.

When and so long as the tip clearance referred to above falls within the above described predetermined range, the performance of the supercharger 32 can be maintained. The smaller the tip clearance, the higher the performance of the supercharger 32 at the time of high speed rotation. Since the axial position is adjusted by the rotary unit RU in its entirety, the rotational balance will not be disordered even when the axial position is adjusted.

Figure 4:
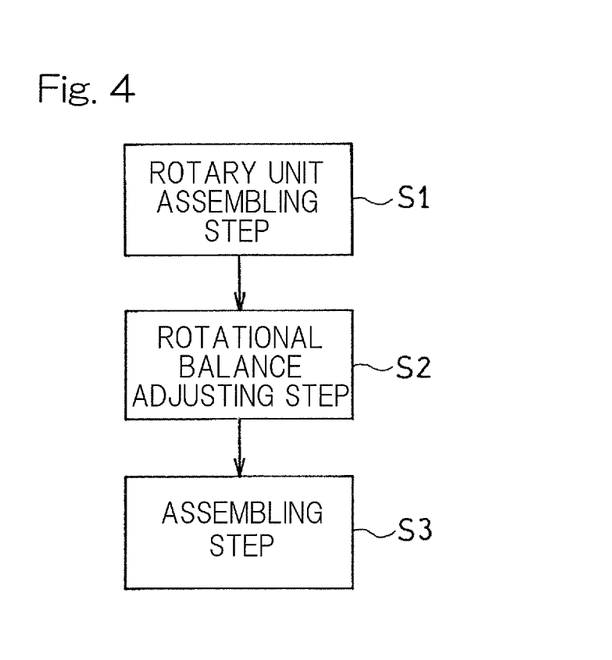
FIG. 4 is a flowchart showing a balance adjusting method for the rotary unit.

Hereinafter, a balance adjusting method for the rotary unit RU shown in FIG. 3 and a method of assembling it onto the supercharger will now be described. As shown in FIG. 4, the balance adjusting method includes a rotary unit assembling step S1 of assembling the rotary unit RU and a rotational balance adjusting step S2 of conducting the balance adjustment of the assembled rotary unit U. The rotary unit U after the balance adjustment is incorporated into the supercharger casing 56 at an assembling step S3.

During the rotary unit assembling step S1, the bearing assembly BA and the oil seal assembly SA are fitted to the supercharger rotary shaft 44 shown in FIG. 3 and, then the impeller 50 is mounted on the left side end portion 44a (tip end portion) of the supercharger rotary shaft 44. Thereafter, the nut member 85 is threadingly engaged with the male threaded portion on the tip end of the supercharger rotary shaft 44. With the nut member 85 so fastened as discussed above, the impeller 50, the inner ring 69a of the bearing assembly BA, the spacer 71 and the collar 75 of the oil seal assembly SA are pressed axially (towards the right side) to allow them to be sandwiched between the externally threaded gear 78 and the nut member 85. In this way, the impeller 50, the inner ring 69a of the bearing assembly BA, the spacer 71 and the collar 75 are fixed to the supercharger rotary shaft 44 in a fashion immovable relative to each other and, in this way, the assemblage of the rotary unit U is completed.

During the rotational balance adjusting step S2, while the outer peripheral surface of the bearing housing 76 of the bearing assembly BA and the seal holding body 79 are supported with the use of a jig, the impeller 50 is rotated and the adjustment portion 100 in the nut member 85 is ground to thereby accomplish the rotational balance of the rotary unit RU. If so required, the rotational balance may be adjusted by scraping a back surface of the impeller 50 that little affects the performance of the supercharger 32. In the practice of the embodiment now under discussion, the balance is so adjusted that the center of gravity of the rotary unit RU may approach the axis of the rotary unit RU. By so doing, it is possible to avoid the possibility that the bearing 69 may be damaged and/or the rotary unit RU may constitute a source of vibrations when the rotary unit RU is driven at a high speed.

The nut member 85 will not possibly be formed by means of a mechanical processing and is generally formed to a non-columnar shape such as, for example, a hexagonal shape. For this reason, the rotational balance is apt to fluctuate relative to the supercharger rotary shaft 44. Accordingly, even though the rotational balance is adjusted with the impeller 50 alone, the rotational balance may not be well adjusted during a condition in which the nut member 85 is mounted. If the rotational balance is adjusted while the rotary unit RU is in the assembled condition as is the case with the embodiment now under discussion, the balance can be adjusted with due consideration paid to the rotational balance of the rotating components RM other than the impeller 50. Therefore, accuracy of the rotational balance can be increased.

During the assembling step S3, the rotary unit RU, after the rotational balance has been adjusted, is incorporated in the supercharger casing 56 without being dismantled. At this time, by inserting the shim 102 in between the seal holding body 79 of the oil seal assembly SA and the supercharger casing 56, the tip clearance between the impeller 50 and the supercharger casing 56 is adjusted.

In the construction hereinbefore fully described, since the impeller 50, the bearing assembly BA and the oil seal assembly SA are integrated together with the supercharger rotary shaft 44 by the use of the nut member 85, the rotary unit RU can be integrally fitted in unit to the supercharger casing 56. As a result, in a condition in which the impeller 50, the bearing assembly BA and the oil seal assembly SA are integrated with the supercharger rotary shaft 44, the balance of the rotary unit RU can be adjusted. Therefore, no balance adjustment is needed after the rotary unit RU has been incorporated in the supercharger 32 and, for this reason, the number of assembling steps can be reduced. Also, since the nut member 85 is provided with the adjustment portion 100 for the adjustment of the rotational balance, as compared with grinding of only the impeller 50, the balance adjustment can be easily accomplished with the increase of the number of choices in adjustment surface.

Also, since the seal holding body 79 of the seal assembly SA is fixed to the supercharger casing 56 by the use of the bolt 81, the rotary unit RU can be easily fitted to the supercharger casing 56. For this reason, there is no need to press-fit the rotary unit RU into the supercharger casing 56, and therefore, the assemblage is easy.

In the practice of the embodiment now under discussion, since the use is made of the planetary gear device 54 to transmit the power to the rotary unit RU, centering of the three shafts, that is, the input shaft 65, the carrier shaft 86 and the supercharger rotary shaft 44 is needed, and the necessary alignment is difficult to accomplish such centering. However, since the bearing housing 76 is radially movably supported by the supercharger casing 56 through the oil layer 96, fluctuation of the supercharger rotary shaft 44 resulting from the use of the planetary gear device 54 can be absorbed. In such case, although the bearing housing 76 cannot be fixed to the supercharger casing 56, fixing of the seal holding body 79 to the supercharger casing 56 makes it possible for the rotary unit RU to be rotatably accommodated within the supercharger casing 56. In addition, since the seal holding body 79 concurrently serves as a stopper portion for avoiding an undesirable axial movement of the bearing housing 76, the number of component parts can be reduced.

Also, the insertion of the shim 102 in between the seal holding body 79 of the oil seal assembly SA and the supercharger casing 56 results in adjustment of the tip clearance between the impeller 50 and the supercharger casing 56 and, therefore, the clearance adjustment of the impeller 50 can be easily accomplished.

Also, the rotational balance of the rotary unit RU is performed while the outer peripheral surface of the bearing housing 76 is supported. Accordingly, since the balance of the rotary unit RU can be accomplished in the condition in which the impeller 50, the bearing assembly BA and the oil seal assembly SA have been integrated with the supercharger rotary shaft 44, the adjustment work can be easily accomplished.

In the practice of the preferred embodiment, as the rotary unit RU the bearing housing 76, which does not rotate together with the impeller 50, is included in the rotary unit RU. Accordingly, while the outer peripheral portion of the bearing housing 76 is supported with the jig, the rotational balance adjustment can be accomplished. As a result, the adjustment of the rotational balance can be easily and precisely performed. Thus, a portion which rotatably supports the rotating component RM rotatable together with the impeller 50 is preferably included in the rotary unit RU.

The present invention having been fully described in connection with the preferred embodiments thereof with reference to the accompanying drawings, the present invention is not necessarily limited to that shown and described hereinabove and is shown and described for the purpose of illustration and, therefore, numerous changes and modifications are apparent to those skilled in the art without departing from the spirit of the present invention. By way of example, although in describing the embodiments of the present invention the adjustment portion 100 has been shown and described as provided in the nut member 85, the present invention is not necessarily limited thereto and the adjustment portion 100 may be provided in any other rotary unit forming component than the impeller 50. For example, the collar may be disposed between the impeller 50 and the nut member 85, and the adjustment portion 100 may be provided in this collar. At this time, the collar shall be given an eccentricity, and the balance adjustment can be accomplished by rotationally moving the collar to change the circumferential position thereof.

The rotary unit according to the present invention is suitably applied to the centrifugal type supercharger in which the impeller rotates at a relatively high speed and, in particular, can be suitably applied to the supercharger of which speed can be increased by the planetary gear device. Also, the present invention can be suitably applied to the supercharger of a kind that can be driven by a power from a device of which number of rotations is a relatively high speed such as, for example, an engine. It is, however, to be noted that application may be made to the supercharger of any other structure and also to the supercharger of a kind mounted on the engine for an automotive vehicle other than the motorcycle. Application may also be made to the supercharger of a kind that is driven by exhaust energies, an electrically powered motor and so on other than the rotational force of the engine.

The rotary unit RU, if including the collar 75 in the seal assembly SA, works satisfactorily, and the oil seal 77 and the seal holding body 79 may be dispensed with from the rotary unit RU. Also, the use of the seal assembly SA may be dispensed with and the present invention is equally applicable to the supercharger of a structure that does not make use of the shim 102.

Furthermore, the use of the oil layer 96 may not be essential. In such case, the bearing housing 76 may be press fitted into the supercharger casing 56, or the bearing housing itself may be formed in the supercharger casing 56. Moreover, although in describing the foregoing embodiments of the present invention the rotary unit RU has been shown and described as integrated together with the rotating components sandwiched between the externally threaded gear 78, which is of a large diameter and provided at the base end portion, and the nut member 85 which is engaged with the tip end, the structure of the rotary unit RU may not be necessarily limited to that shown and described. For example, the present invention should be understood as including such an arrangement that a small diameter gear is provided in a base end portion and a large diameter stopper is provided in a tip end portion with the rotating components sandwiched between the stopper and the nut member threaded to the base end portion.

Accordingly, such changes and modifications are, unless they depart from the scope of the present invention as delivered from the claims annexed hereto, to be construed as included therein.

REFERENCE NUMERALS

32 . . . Supercharger
44 . . . Supercharger rotary shaft (Rotary shaft)
50 . . . Impeller
54 . . . Planetary gear device (Transmission)
56 . . . Supercharger casing (Casing)
69 . . . Bearing
69*a* . . . Inner ring of the bearing (Rotating component RM)
69*b* . . . Outer ring of the bearing (Non-rotating component NM)
75 . . . Collar (Rotating component RM)
76 . . . Bearing housing (Non-rotating component NM)
77 . . . Oil seal (Non-rotating component NM)
79 . . . Seal holding body (Stopper member, Non-rotating component NM)
85 . . . Nut member (Fixing member)
96 . . . Oil layer
100 . . . Adjustment portion
102 . . . Shim
E . . . Engine
RU . . . Rotary unit
S1 . . . Rotary unit assembling step
S2 . . . Rotational balance adjusting step
S3 . . . Assembling step

What is claimed is:

1. A balance adjusting method for a rotary shaft of a centrifugal flow supercharger to pressurize an intake air for an engine, which method is to adjust the balance of the rotary shaft of the supercharger prior to assemblage of the supercharger, the method comprising:

a rotary unit assembling step of mounting to the rotary shaft an impeller, to be fixed to a tip end of the rotary shaft, and a rotation member, which is separate from the impeller and capable of rotating integrally with the rotary shaft, and then axially pressing the impeller and the rotation member with the use of a fixing member to fix to the rotary shaft, thereby to assemble a rotary unit having a bearing housing in the rotary unit to accommodate therein a bearing to support the rotary shaft;

a rotational balance adjusting step of adjusting the rotational balance of the rotary unit by forming an adjustment portion in the rotation member or the fixing member to allow an adjustment on the adjustment portion;

an assembling step of incorporating the rotary unit, after the rotational balance has been adjusted, in a casing of the supercharger without being dismantled; and during the rotational balance adjusting step, the rotary unit is rotated, while fixedly supporting the bearing housing, to adjust the rotational balance of the rotary unit.

2. An assembling method for the centrifugal supercharger including a rotary shaft, which has been adjusted by the balance adjusting method as claimed in claim 1, comprising providing a non-rotating component in the rotary unit that does not rotate together with the rotary shaft, and inserting a shim in between the non-rotating component and the casing to adjust a tip clearance between the impeller and the casing.

* * * * *